United States Patent [19]

Yoshida

[11] Patent Number: 4,460,463

[45] Date of Patent: Jul. 17, 1984

[54] ELECTROMAGNETIC FILTER

[75] Inventor: Satoshi Yoshida, Funabashi, Japan

[73] Assignee: Japan Organo Co., Ltd., Japan

[21] Appl. No.: 458,268

[22] Filed: Jan. 17, 1983

[30] Foreign Application Priority Data

Feb. 12, 1982 [JP] Japan .................................. 57-17243

[51] Int. Cl.[3] .............................................. B01D 35/06

[52] U.S. Cl. ..................................... 210/222; 210/695

[58] Field of Search .................... 209/232, 223 R, 214; 210/695, 223, 222; 55/100

[56] References Cited

U.S. PATENT DOCUMENTS 3,627,678 12/1971 Marston et al. ..................... 210/695

OTHER PUBLICATIONS

IEEE Transactions of Magnetics, vol. Mag.-17, No. 6, pp. 3308–3310, Kelland et al., Nov. 1981.

*Primary Examiner*—Frank Sever
*Attorney, Agent, or Firm*—McGlew and Tuttle

[57] ABSTRACT

An electromagnetic filter includes a filtering column filled with a magnetic material and an electromagnetic coil disposed around the filtering column. The magnetic material comprises a plurality of cylindrical, prismatic or plate-like masses of magnetic material placed horizontally in the filtering column so as to form a plurality of layers, each of the masses of magnetic material consisting of a multiplicity of magnetic wires or magnetic tapes bundled so as to have their longitudinal axes arranged in substantially in parallel.

The magnetic material filling the filtering column is distributed to a uniform density, so that impairment of the treating effect due to channeling of feed water through sparse portions of the magnetic material and the insufficient washing of dense portions thereof during the cleaning operation for expelling the magnetic particles entrapped in the magnetic material can be avoided. The efficiency of the electromagnetic filter is enhanced because all of the magnetic material filling the filtering column effectively participates in the entrapment of magnetic particles suspended in the feed water.

8 Claims, 9 Drawing Figures

ELECTROMAGNETIC FILTER

FIELD AND BACKGROUND OF THE INVENTION

This invention relates to an electromagnetic filter filled with orderly arranged masses of magnetic material having controlled orientation.

An electromagnetic filter is an apparatus for removing magnetic particles suspended in feed water by magnetic attraction to the magnetic material filling the internal space of a filtering column and is used in such applications as the removal of magnetic particles, for example, of iron oxide contained in the condensate from a power station. The electromagnetic filter further includes an electromagnetic coil disposed around the filtering column filled with the magnetic material, and a rectifier for supplying a direct current to the electromagnetic coil. For the purpose of removing magnetic particles suspended in feed water, the rectifier is used to convert an alternating current into a direct current, which is supplied to the electromagnetic coil. The magnetic flux so produced serves to magnetize the magnetic material within the filtering column. Then, feed water is passed through the filtering column from the top or from the bottom, so that magnetic particles suspended therein are entrapped by magnetic attraction to the magnetic material. After the amount of magnetic particles entrapped in the magnetic material has reached an appreciable level, the passage of water is discontinued and the supply of a direct current to the electromagnetic coil is shut off to demagnetize the magnetic material. Subsequently, the magnetic material is washed with water and air so that the magnetic particles entrapped in the magnetic material may be expelled from the filtering column. In this manner, the passage of water and the cleaning operation are performed alternately.

The magnetic materials suitable for use in electromagnetic filters include ball-shaped magnetic materials, spiral magnetic materials, woolly magnetic materials, and the like. However, these magnetic materials have their own merits and demerits. Thus, it is common practice to use one of these three types of magnetic materials according to circumstances or a combination thereof in some cases.

Among the foregoing three types, woolly magnetic materials are being widely used because of their highest porosity. However, conventional electromagnetic filters using a woolly magnetic material have the following disadvantages.

A conventional woolly magnetic material comprises a mass of randomly or disorderly arranged thin wires, 40 to 500μ in diameter, or very thin, narrow tapes, 40 to 500μ in width and 10 to 50μ in thickness, made of a material (for example, SUS 430, amorphous magnetic material, etc.) which becomes magnetized when placed in a magnetic field. Conventional electromagnetic filters are filled with such a woolly magnetic material either by pressing it directly into the filtering column or by pressing it into cases and then placing these cases in the filtering column. Owing to such disorderly placement, the woolly magnetic material is not distributed to a uniform density, resulting in the formation of dense and sparse portions in each layer of the magnetic material. Consequently, these electromagnetic filters have the disadvantage that the treating effect may be impaired by channeling of the feed water through the sparse portions and, in the cleaning operation for expelling the magnetic particles entrapped in the magnetic material, the dense portions may be washed insufficiently.

Moreover, since the aforesaid thin wires or very thin, narrow tapes are randomly arranged without order, they lie in varying directions (for example, parallel, perpendicular, oblique, etc.) with respect to the magnetic flux. For those segments of thin wires or narrow tapes which are perpendicular to the magnetic flux, their upper and lower surfaces (as viewed with respect to a horizontal plane) constitute the north and south poles, respectively, so that a large area is provided for the magnetic attraction of magnetic particles suspended in feed water. However, for those segments of thin wires or narrow tapes which are parallel to the magnetic flux, only their upper and lower ends constitute the north and south poles, respectively, so that the effective area for the entrapment of magnetic particles by magnetic attraction is small.

Accordingly, the random or disorderly arrangement of thin wires or narrow tapes is also disadvantageous in that, even if they are used in large numbers, not all of them participate in the entrapment of magnetic particles by magnetic attraction.

SUMMARY OF THE INVENTION

It is an object of the present invention to provide an electromagnetic filter in which the magnetic material filling the filtering column is distributed to a uniform density, whereby the impairment of the treating effect due to channeling of the feed water through sparse portions of the magnetic material and the insufficient washing of dense portions thereof during the cleaning operation for expelling the magnetic particles entrapped in the magnetic material can be avoided.

It is another object of the present invention to provide an electromagnetic filter in which all of the magnetic material filling the filtering column effectively participates in the entrapment of magnetic particles suspended in the feed water.

It is still another object of the present invention to provide an electromagnetic filter in which the magnetic material filling the filtering column has an increased density.

The above objects of the present invention are accomplished by an electromagnetic filter including a filtering column filled with a magnetic material and an electromagnetic coil disposed around said filtering column, characterized in that said magnetic material comprises a plurality of cylindrical, prismatic or plate-like masses of magnetic material placed horizontally in said filtering column so as to form a plurality of layers, each of said masses of magnetic material consisting of a multiplicity of magnetic wires or magnetic tapes bundled so as to have their longitudinal axes arranged in substantially the same direction.

BRIEF DESCRIPTION OF THE DRAWINGS

FIG. 6(*b*) is a vertical sectional view taken along the line A—A' of FIG. 6(*a*)

DESCRIPTION OF THE PREFERRED EMBODIMENTS

The present invention will hereinafter be described in detail with reference to the accompanying drawings which are presented for purposes of illustration only and are not intended to limit the scope of the invention.

Figure 1:
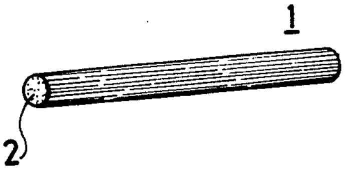
FIGS. 1 to 3 are perspective views illustrating various types of masses of magnetic material suitable for use in the practice of the present invention.
Figure 2:
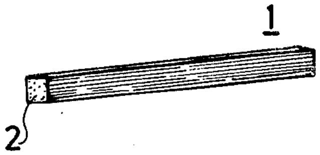
Figure 3:
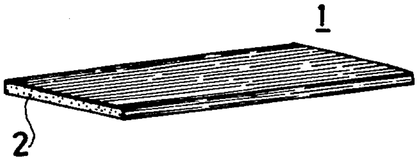

FIGS. 1, 2 and 3 are perspective views illustrating various types of masses 1 of magnetic material suitable for use in the practice of the present invention. Each of these masses 1 consists of a multiplicity of thin magnetic wires or very thin, narrow tapes (hereinafter referred to briefly as magnetic wires) 2 bundled so as to have their longitudinal axes arranged in substantially the same direction. In bundling the magnetic wires 2, no binder is required because they more or less twine together by themselves. However, a suitable binder or binders may be used as required.

The electromagnetic filter of the present invention is characterized in that a plurality of masses 1 as illustrated in any of FIGS. 1–3 are placed horizontally in the filtering column so as to form a plurality of layers. For example, this can be accomplished by cutting or preforming a plurality of plate-like masses 1 (as illustrated in FIG. 3) into a shape conforming to the cross section of the filtering column and placing them horizontally in the filtering column so as to form a plurality of layers. However, if the cross-sectional area of the filtering column is large, each mass 1 has such a large cross-sectional area that it may be somewhat difficult to bundle the magnetic wires 2.

Figure 4:
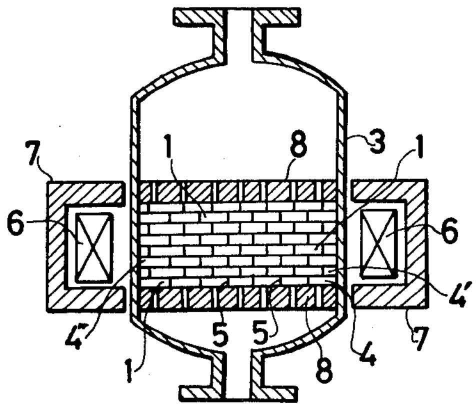
FIG. 4 is a vertical sectional view of an electromagnetic filter in accordance with the present invention.

In such a case, the above-described purpose may be accomplished, as illustrated in FIG. 4, by providing a plurality of masses 1 having a cross-sectional area smaller than that of filtering column 3, arranging them in parallel and contiguous relationship to form a single layer 4, and then laying a plurality of such layers (such as 4, 4', 4'', etc.) one on top of another. In this arrangement, it is preferable to place the masses 1 in such a way that, as illustrated in FIG. 4, the boundaries 5 between masses 1 in one layer (such as 4, 4', 4'', etc.) do not align with those in the overlying and underlying layers. The electromagnetic filter of FIG. 4 further includes a coil 6 disposed around the filtering column 3, a return frame 7 covering the coil 6, and a perforated plate 8 having a large number of openings.

Thus, the use of masses 1 having a relatively small size serves to eliminate the difficulty in bundling the magnetic wires 2. Moreover, the avoidance of alignment of boundaries 5 in adjoining layers serves to prevent channeling of the feed water.

FIG. 4 illustrates an electromagnetic filter in which a large number of plate-like masses 1 are arranged in layers. However, it is to be understood that cylindrical and prismatic masses 1 as illustrated in FIGS. 1 and 2 can be used in the same manner as plate-like masses 1.

Figure 5:
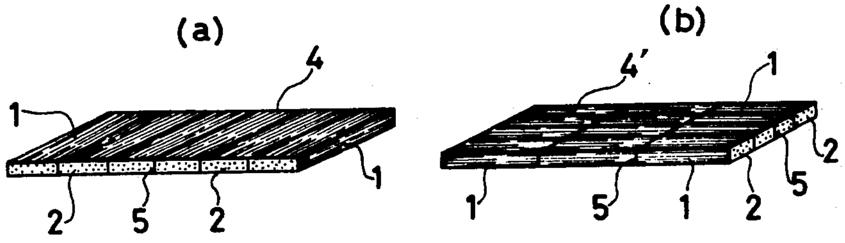
FIGS. 5(*a*) and 5(*b*) are perspective views illustrating the arrangement of the masses of magnetic material used in one embodiment of the present invention.

It is also preferable that, as illustrated in FIGS. 5(*a*) and 5(*b*), a large number of masses 1 are placed in filtering column 3 so as to form a crosshatch pattern. More specifically, this can be accomplished by arranging a plurality of masses 1 in parallel and contiguous relationship to form a layer 4, laying another layer 4' on top of layer 4 in such a way that the longitudinal direction of magnetic wires 2 in layer 4' makes an angle of 90° with that in layer 4, laying a further layer similar to layer 4 on top of layer 4', and so on. This permits the positive avoidance of alignment of boundaries 5 in adjoining layers and thereby serves to provide an evenly distributed flow of water. As for the advantage offered by the arrangement of masses 1 in a crosshatch pattern, the same is true of cylindrical and prismatic masses 1.

Figure 6:
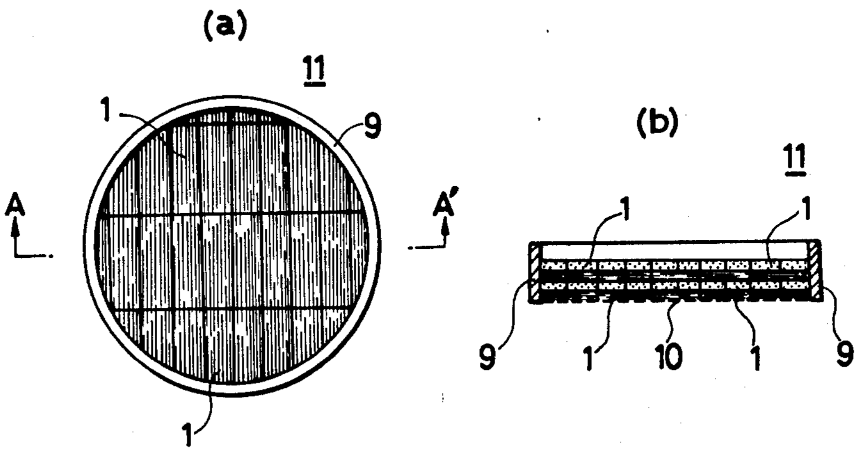
FIG. 6(*a*) is a plan view of a case in which a plurality of masses of magnetic material are arranged in layers.

An alternative embodiment of the present invention involves the use of a case 11 which, as illustrated in FIGS. 6(*a*) and 6(*b*), comprises a ring 9 having an outer diameter approximately equal to the inner diameter of filtering column 3 and a screen 10 mounted at the bottom of ring 9. More specifically, a plurality of masses 1 of magnetic material suitable for use in the practice of the present invention are placed horizontally in case 11 so as to form a plurality of layers, and a plurality of such cases 11 are stacked in the internal space of filtering column 3. Also in this embodiment, a large number of masses 1 having a cross-sectional area smaller than that of ring 9 may be placed in ring 9 so as to form a plurality of layers, in substantially the same manner as illustrated in FIG. 4. Moreover, the masses 1 may be placed in such a way that the boundaries between masses 1 in one layer do not align with those in the overlying and underlying layers. Furthermore, the masses 1 may be placed so as to form a crosshatch pattern in which the longitudinal direction of magnetic wires 2 in one layer makes an angle of approximately 90° with that in the overlying and underlying layers.

The use of cases 11 filled with masses 1 can facilitate the placement in the filtering column and removal therefrom of the magnetic material. In making a case 11, a spiral magnetic material may be used in place of screen 10 to form a composite magnetic material consisting of magnetic wires and a spiral magnetic material.

The operation of the electromagnetic filter of the present invention will now be explained.

Figure 7:
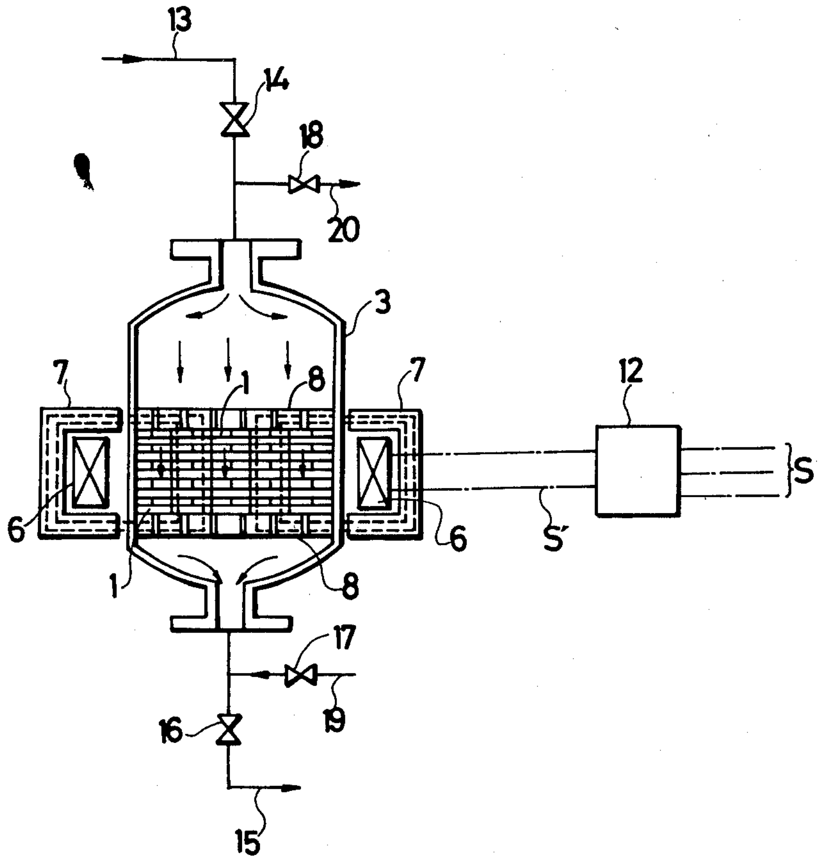
FIG. 7 is a diagrammatic view illustrating the flow pattern in the electromagnetic filter of the present invention.

FIG. 7 is a schematic view illustrating the flow pattern in the electromagnetic filter of the present invention. When an alternating current S is supplied to a rectifier 12, it is converted into a direct current S' which is then supplied to coil 6. This produces a magnetic flux as shown by broken lines, causing the masses 1 placed in filtering column 3 to become magnetized. Then, the valve 14 installed in a feed water inlet pipe 13 and the valve 16 installed in a treated water outlet pipe 15 are opened to introduce feed water containing suspended magnetic particles into the electromagnetic filter. As a result, magnetic particles suspended in the feed water are entrapped by magnetic attraction to the multiplicity of magnetic wires 2 included in each mass 1, so that treated water free of magnetic particles is obtained. Since each of the masses 1 used in the practice of the present invention consists of a multiplicity of magnetic wires 2 bundled so as to have their longitudinal axes in substantially the same direction, the magnetic wires 2 are distributed to a uniform density. This permits the feed water to flow evenly without channeling, so that well-treated water is obtained consistently. Moreover, since the masses 1 each consisting of a multiplicity of magnetic wires 2 bundled so as to have their longitudinal axes arranged in substantially the same direction are placed horizontally in filtering column 3, most of the magnetic wires 2 placed in filtering column 3 can be made perpendicular to the magnetic flux. Accordingly, the magnetic wires 2 have a larger effective area for the entrapment of magnetic particles than the woolly magnetic material used in conventional electromagnetic filters.

When the pressure loss of filtering column 3 due to the entrapment of magnetic particles in masses 1 has reached an appreciable level, a cleaning operation is performed. More specifically, the supply of a direct current to coil 6 is shut off. After the valves 14 and 16 are closed, valves 17 and 18 are opened to introduce wash water or a mixture of wash water and air through a wash water inlet pipe 19 and thereby wash the masses 1. The washings full of magnetic particles are discharged through a waste water outlet pipe 20. Since the masses 1 used in the practice of the present invention show an even distribution of the magnetic material, no insufficient washing is encountered during the cleaning operation, as contrasted with conventional electromagnetic filters filled with a woolly magnetic material.

In the practice of the present invention, a plurality of masses of magnetic material each consisting of a multiplicity of magnetic wires bundled so as to have their longitudinal axes arranged in substantially the same direction may also be used in combination with other types of magnetic material such as spiral magnetic materials, ball-shaped magnetic materials, and the like.

As described above, the electromagnetic filter of the present invention has the feature that the magnetic wires filling the filtering column are arranged in an orderly state, as contrasted with conventional woolly magnetic materials comprising a mass of randomly or disorderly arranged magnetic wires. This permits the flow of water to be evenly distributed across the cross section of the filtering column, so that the electromagnetic filter of the present invention has various advantages over conventional ones, such as the avoidance of channeling of the feed water, an increased effective area for the entrapment of magnetic particles, and the like.

I claim:

1. An electromagnetic filtering apparatus for the magnetic removal of particles from a fluid, comprising:
- a filtering column;
- magnetic material within said column;
- an electromagnetic coil disposed around said column;
- means for energizing said coil;
- means for introducing fluid into and removing fluid from said column; and
- means for removing from said magnetic material particles retained thereon;
- said magnetic material consisting essentially of a plurality of one of cylindrical, prismatic and plate-like unit masses thereof layered horizontally and substantially uniformly within said column, each of said unit masses consisting essentially of a plurality of one of magnetic wires and magnetic tapes bundled with their longitudinal axes substantially arranged in parallel.

2. The electromagnetic filtering apparatus of claim 1, wherein each layer of said unit masses of magnetic material consists essentially of a plurality of said unit masses arranged in parallel and contiguous relationship.

3. The electromagnetic filter apparatus of claim 1, wherein said unit masses of magnetic material rest on horizontal screens mounted on bottoms of a plurality of rings, said rings having an outer diameter approximately equal to an inner diameter of said column and being stacked within said column one upon another.

4. The electromagnetic filter apparatus of claim 3, wherein at least one of said rings contains a layered plurality of said unit masses and the cross-sectional area of all of said unit masses contained in said ring is smaller than the cross-sectional area of said ring.

5. The electromagnetic filtering apparatus of claims 1 or 2 or 3, wherein the longitudinal axes of the bundles of said magnetic wires or magnetic tapes in one layer are arranged at approximately 90° with respect to those in any adjacent layer.

6. The electromagnetic filtering apparatus of claims 2 or 3, wherein the boundaries between any two adjacent unit masses of magnetic material in one layer are not aligned with the boundaries between adjacent unit masses in any other adjacent layer.

7. The electromagnetic filtering apparatus of claim 3, wherein each screen comprises a spiral magnetic material.

8. In the electromagnetic filtering apparatus of claim 1, where a cylindrical, prismatic or plate-like aggregation of magnetic material consisting of a plurality of magnetic wires or magnetic tapes bundled with their longitudinal axes substantially unidirectionally arranged.

* * * * *